L. M. HICKS.

WASHMITT.

APPLICATION FILED JULY 9, 1915.

Reissued Sept. 14, 1915.

13,977.

Witnesses:

E. S. Clement.

L. I. McBath

Inventor:

Laura M. Hicks by: Bradford & Doolittle,

Attorneys.

UNITED STATES PATENT OFFICE.

LAURA M. HICKS, OF BLOOMINGTON, INDIANA.

WASHMITT.

13,977. Specification of Reissued Letters Patent. Reissued Sept. 14, 1915.

Original No. 1,132,475, dated March 16, 1915, Serial No. 868,194. Application for reissue filed July 9, 1915. Serial No. 39,013.

*To all whom it may concern:*

Be it known that I, LAURA M. HICKS, a citizen of the United States, residing at Bloomington, Monroe county, and State of Indiana, have invented and discovered certain new and useful Improvements in Washmitts, of which the following is a specification.

My said invention consists in an improved construction of "wash mitt," or device adapted to be worn upon one hand and afford a rubbing surface upon which the user can, with the other hand, rub small articles, such as laces, handkershiefs, and articles of delicate fabric and texture, for cleansing purposes, the construction being such that the mitt may be readily adjusted to the hand, firmly and rigidly held while in use, and readily and conveniently removed when desired, all as will be hereinafter more fully described and claimed.

Figure 1:
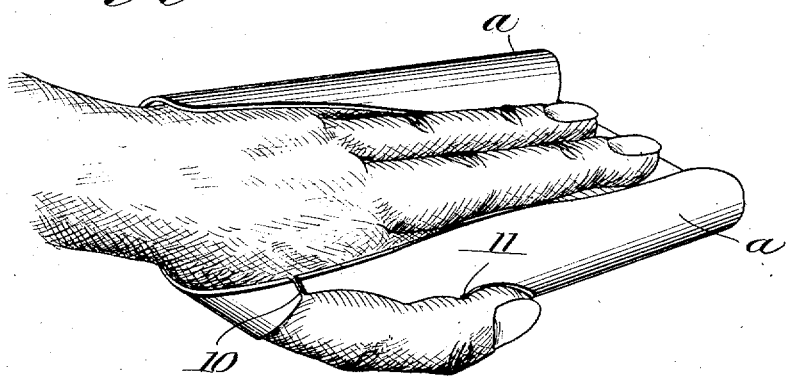
Figure 2:
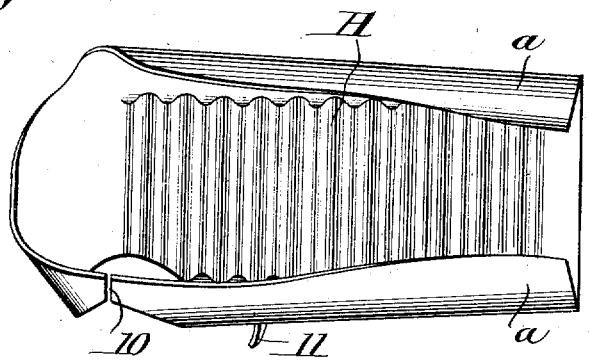
Figure 3:
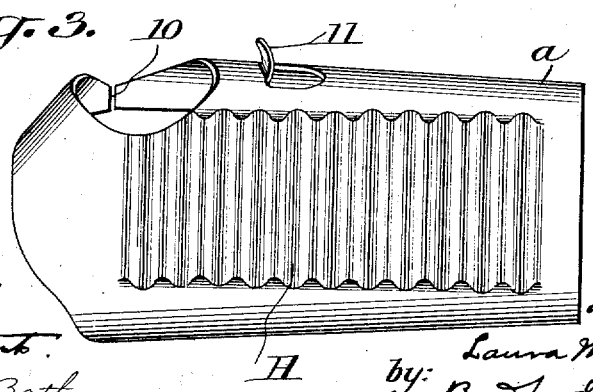

Referring to the accompanying drawings which are made a part hereof and on which similar reference characters indicate similar parts, Figure 1 is a perspective view illustrating a mitt of my improved construction as adjusted to the hand and ready for use, Fig. 2 a view of the back of the mitt removed from the hand, and Fig. 3 a view of the front of the mitt removed from the hand.

The mitt consists of a metal plate A formed preferably of light metal, such as aluminum, although zinc, copper, brass or any appropriate metal may be used. It is comparatively thin and is formed of a size and shape to be easily adjusted to the hand, having its edges from a point near the outer end rolled back to form finger receiving sockets or recesses *a* in which the first and little finger of the hand may be readily inserted. A crotch is formed near the base of the mitt in position to engage the thumb, and a lip or lug 11 is bent or pressed outward from the face of the mitt to form a hold against which the ball of the thumb may be placed to hold the mitt firmly in place upon the hand and prevent it from moving as the article being washed is rubbed back and forth upon its surface. The thumb receiving crotch is preferably formed elliptically shaped, or of any appropriate formation to engage the thumb near its base, as clearly shown in the several figures of the drawing. The rear edge of the metal plate is also preferably formed to turn or bend up around the base of the thumb, its point, when in position of use, being adjacent to the outer edge of the thumb engaging crotch, leaving a space or slit 10 between the adjacent points. By this means the rear part of this edge of the mitt may be adjusted against the thumb to fit hands of different sizes, and thus securely anchor the mitt to the base of the thumb, the metal being of a character to permit such arrangement and adjustment.

This form of mitt, as will be readily seen, is comparatively inexpensive to construct, while affording every advantage in use of the ordinary wash board and for the particular purpose intended, enabling the user to wash articles of a character easily injured or destroyed, with such care as to avoid such injury or destruction.

It will be obvious that various modifications in the details of form may be made within the scope of my invention as defined in the following claims.

Having thus fully described my said invention what I claim as new and desire to secure by Letters Patent is:

1. A wash mitt of the character described formed of a sheet of metal having a transversely corrugated surface with its edges rolled back to form finger receiving sockets, and with a thumb engaging formation, substantially as set forth.

2. A wash mitt of the character described consisting of a single metal plate having a corrugated surface and formed with integral finger receiving sockets on its edges and with a thumb receiving formation into which the thumb may be inserted, and with a thumb hold consisting of a projecting lip adjacent to said thumb receiving formation adapted to form a bearing for the ball of the thumb to enable the wearer to hold said mitt in place during use, substantially as set forth.

3. A wash mitt of the character described comprising a metal plate having a corrugated rubbing surface and finger receiving sockets, formed by rolling back its side edges at its outer end and formed with a thumb receiving formation with a slit in one side extending to the outside of the device, whereby said formation may be adjusted to the hand of the wearer and secured to the base of the thumb, substantially as set forth.

4. A wash mitt of the character described formed of a sheet of metal with its edges rolled back to receive the outside fingers of the hand and formed with a transversely corrugated surface, one edge having a thumb engaging formation and a projection adjacent thereto on which the ball of the thumb may bear, substantially as set forth.

5. A wash mitt of the character described formed of a sheet of metal with its edges turned back to receive the outside edges of the hand, the surface of said wash mitt being corrugated to form a "rubbing" surface, and means on one edge of said wash mitt for engagement with the thumb for retaining said wash mitt in position on the hand when in use, substantially as set forth.

In witness whereof I have hereunto set my hand and seal at Bloomington, Indiana this 1st day of July, A. D. nineteen hundred and fifteen.

LAURA M. HICKS. [L. S.]

Witnesses:
MARY HICKS,
HELEN HICKS.